US012695504B2

(12) United States Patent
Toba et al.

(10) Patent No.: US 12,695,504 B2
(45) Date of Patent: Jul. 28, 2026

(54) MEASUREMENT CONNECTOR, MEASUREMENT JIG, AND MEASUREMENT SYSTEM

(71) Applicant: Sony Group Corporation, Tokyo (JP)

(72) Inventors: Kazuaki Toba, Kanagawa (JP);
Masanari Yamamoto, Kanagawa (JP);
Hiroshi Morita, Kanagawa (JP)

(73) Assignee: SONY GROUP CORPORATION,
Tokyo (JP)

( * ) Notice: Subject to any disclaimer, the term of this patent is extended or adjusted under 35 U.S.C. 154(b) by 277 days.

(21) Appl. No.: 18/575,111

(22) PCT Filed: Mar. 7, 2022

(86) PCT No.: PCT/JP2022/009670
§ 371 (c)(1),
(2) Date: Dec. 28, 2023

(87) PCT Pub. No.: WO2023/281812
PCT Pub. Date: Jan. 12, 2023

(65) Prior Publication Data
US 2024/0305369 A1 Sep. 12, 2024

(30) Foreign Application Priority Data
Jul. 9, 2021 (JP) ................................. 2021-114404

(51) Int. Cl.
G02B 6/38 (2006.01)
H04B 10/073 (2013.01)

(52) U.S. Cl.
CPC .................................. *H04B 10/073* (2013.01)

(58) Field of Classification Search
CPC ..................................................... G02B 6/3807
See application file for complete search history.

(56) References Cited

U.S. PATENT DOCUMENTS

2004/0022494 A1    2/2004  Liddle et al.
2017/0315317 A1*  11/2017  Jiang ..................... G02B 6/3885
2019/0162909 A1*   5/2019  Toba ...................... G02B 6/353

FOREIGN PATENT DOCUMENTS

JP        H03-276107  A    12/1991
JP        H09-184943  A     7/1997
JP        2009-145676 A     7/2009
JP        2016-153733 A     8/2016
JP        2019-515346 A     6/2019
WO     WO 2017/056889 A1   4/2017

* cited by examiner

*Primary Examiner* — Shi K Li
(74) *Attorney, Agent, or Firm* — Paratus Law Group, PLLC

(57) ABSTRACT

A measurement connector (521) of an aspect according to the present disclosure includes a housing (1) attachable to an optical communication connector of a measurement target device, and an optical detection element (5) that is provided in the housing (1) and detects light emitted from the optical communication connector.

20 Claims, 15 Drawing Sheets

<COLLIMATED BEAM DIAMETER>

| ·Description | Reference | Value | | Unit |
|---|---|---|---|---|
| | | Min | Max | |
| ·Beam diameter | Section 4.2.5.1 | a1 | a2 | um |
| ·Beam parallelism | Section 4.2.5.1 | a3 | a4 | deg |
| ·Beam misalignment | Section 4.2.5.1 | a5 | a6 | um |

FIG.6

<AVERAGE OUTPUT POWER VALUE>

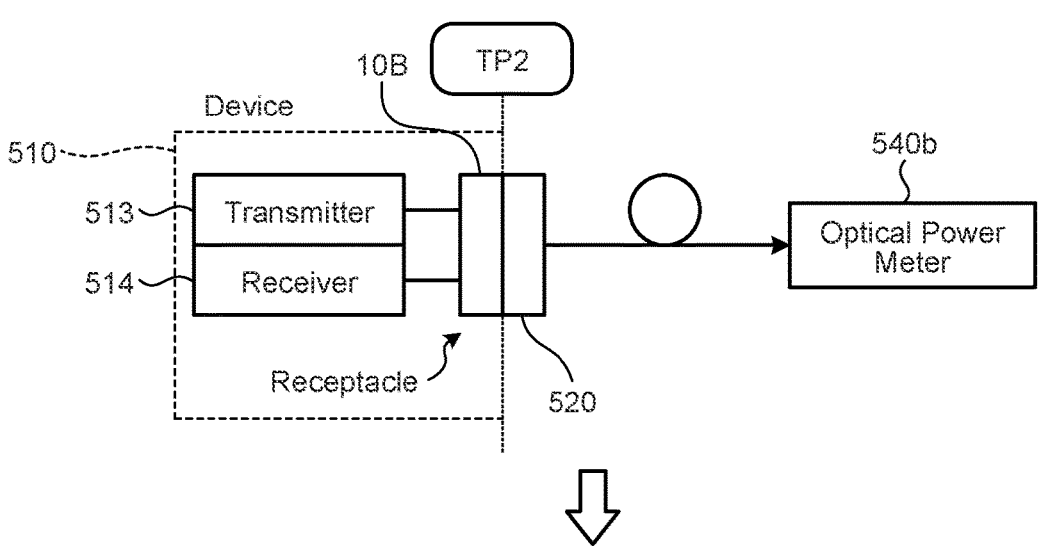

| ·Description | Reference | Value | | TP | Unit |
|---|---|---|---|---|---|
| | | Min | Max | | |
| ·Signaling rate | Section 5.3.1 | b1 | b2 | TP2 | Gbps |
| ·Center wavelength | Section 5.3.2 | b3 | b4 | TP2 | nm |
| ·RMS spectral width | Section 5.3.2 | - | b5 | TP2 | nm |
| ·Average output power (Operating condition) | Section 5.3.3 | b6 | b7 | TP2 | dBm |
| ·Average output power (Cable-off condition) | Section 5.3.3 | - | b8 | TP2 | dBm |
| ·Peak output power | Section 5.3.4 | - | b9 | TP2 | dBm |
| ·Optical Modulation Amplitude(OMA) | Section 5.3.4 | b10 | b11 | | |

FIG.14

Beam diameter d=y
Sin θ =y/x
P=WHOLE RANGE ADDITION

MEASUREMENT CONNECTOR, MEASUREMENT JIG, AND MEASUREMENT SYSTEM

CROSS REFERENCE TO PRIOR APPLICATION

This application is a National Stage Patent Application of PCT International Patent Application No. PCT/JP2022/009670 (filed on Mar. 7, 2022) under 35 U.S.C. § 371, which claims priority to Japanese Patent Application No. 2021-114404 (filed on Jul. 9, 2021), which are all hereby incorporated by reference in their entirety.

FIELD

The present disclosure relates to a measurement connector, a measurement jig, and a measurement system.

BACKGROUND

For example, Patent Literature 1 proposes a robust optical communication connector (optical connector) that simultaneously solves both problems of end surface cleaning and laser safety. When communication is performed by utilization of this optical communication connector, in order to secure mutual connection, it is essential to define power and a beam diameter of output light, an angle of oblique emission, and the like as standards, and also to prescribe a measurement method thereof. In this measurement, a jig to measure an optical communication signal from the optical communication connector is required.

CITATION LIST

Patent Literature

Patent Literature 1: WO 2017/056889 A

SUMMARY

Technical Problem

However, the above optical communication connector includes an optical component therein, and a measurement jig (fixture) corresponding to a measurement target device such as an electronic device including the optical communication connector also requires an optical component. Since it is necessary to minimize an influence on a measurement result of the measurement target device, high machine accuracy is required for the measurement jig, and the measurement jig becomes expensive.

Thus, the present disclosure proposes a measurement connector, a measurement jig, and a measurement system capable of controlling the price.

Solution to Problem

A measurement connector according to the embodiment of the present disclosure includes: a housing attachable to an optical communication connector of a measurement target device; and an optical detection element that is provided in the housing and detects light emitted from the optical communication connector.

A measurement jig according to the embodiment of the present disclosure includes: a measurement connector, wherein the measurement connector includes a housing attachable to an optical communication connector of a measurement target device, and an optical detection element that is provided in the housing and detects light emitted from the optical communication connector.

A measurement system according to the embodiment of the present disclosure includes: a measurement jig having a measurement connector; and a measurement data generation unit, wherein the measurement connector includes a housing attachable to an optical communication connector of a measurement target device, and an optical detection element that is provided in the housing and detects light emitted from the optical communication connector, and the measurement data generation unit generates measurement data on a basis of a detection result of the optical detection element.

BRIEF DESCRIPTION OF DRAWINGS

FIG. 1 is a view illustrating an example of a schematic configuration of an electronic device and an optical communication cable according to an embodiment of the present disclosure.

FIG. 2 is a view illustrating an example of a schematic configuration of an optical communication connector according to the embodiment of the present disclosure.

FIG. 6 is a second view illustrating an example of a parameter standard and a measurement method according to the embodiment of the present disclosure.

FIG. 14 is a view illustrating an example of a schematic configuration of a modification example of the measuring instrument according to the embodiment of the present disclosure.

DESCRIPTION OF EMBODIMENTS

Figure 3:
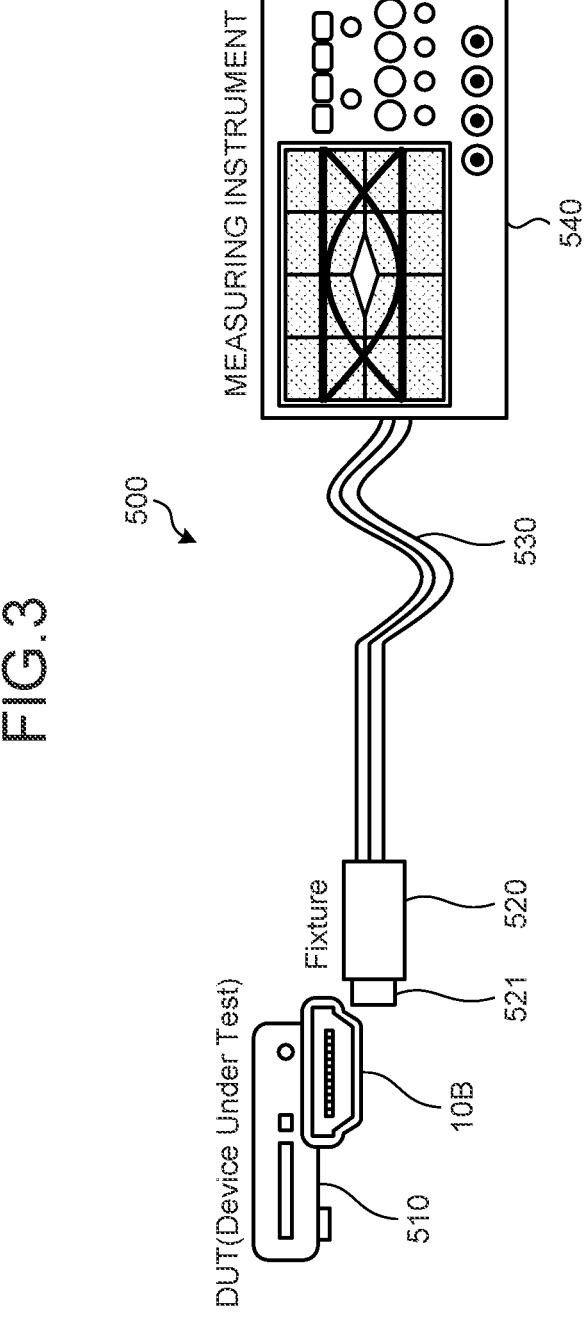
FIG. 3 is a view illustrating an example of a schematic configuration of a measurement system according to the embodiment of the present disclosure.

In the following, embodiments of the present disclosure will be described in detail on the basis of the drawings. Note that the measurement connector, the measurement jig, the measurement system, and the like according to the present disclosure are not limited by these embodiments. Also, in each of the following embodiments, overlapped description is omitted by assignment of the same reference sign to parts that are basically the same.

Each of one or a plurality of embodiments (including examples and modification examples) described in the following can be performed independently. On the other hand, at least a part of the plurality of embodiments described in the following may be appropriately combined with at least a part of the other embodiments. The plurality of embodiments may include novel features different from each other. Thus, the plurality of embodiments can contribute to solving different objects or problems, and can exhibit different effects.

The present disclosure will be described in the following order of items.

1. Introduction
2. Embodiment
2-1. Configuration example of an electronic device and an optical communication cable
2-2. Configuration example of an optical communication connector
2-3. Configuration example of a measurement system
2-4. Configuration example of a measurement target device
2-5. Parameter standard and measurement method
2-6. Light emission of the optical communication connector
2-7. Configuration example of a measurement connector
2-8. Modification example of the measurement connector
2-9. Configuration example of a measuring instrument
2-10. Modification example of the measuring instrument
2-11. Measured value of an optical detection element
2-12. Effect
3. Other embodiments
4. Appendix 1. Introduction In an inter-device interface standard such as a high-definition multimedia Interface (HDMI) (registered trademark), interconnectivity is secured by measurement and authentication whether a device or a cable adopting a connector of the standard is compliant with the standard. When these devices or cables are designed, designing is performed in such a manner that these tests can be passed. In this test and measurement, a highly accurate measurement jig, that is, a fixture, which is designed in such a manner as not to degrade an output signal from a connector of the measurement target device as much as possible is required between the measurement target device and the measuring instrument. Hereinafter, the measurement target device may be referred to as a device under test (DUT).

On the other hand, a connector for an interface between devices using optical communication is proposed in Patent Literature 1 described above. Hereinafter, the connector for an interface is also referred to as an XC connector. In order to secure interconnectivity by normalizing/standardizing a device and a cable using the XC connector similarly to the HDMI (registered trademark), it is necessary to confirm that the device and the cable follow the standards by measuring an output signal from the XC connector.

In order to implement secure communication between the connected devices by using the XC connector with respect to a device equipped with an interface between optical communication devices, all of a transmitter, a receiver, and a cable need to follow to specifications defined by the standard. The predetermined specifications are, for example, a beam diameter, optical path inclination, power, and the like of an output optical signal. It is necessary to measure and confirm that each parameter of the output optical signal output from the XC connector of the transmitter is within a range defined in the standard at the time of designing or authentication.

The measurement jig (fixture) used between the measuring instrument and the DUT is required to have performance and accuracy that do not deteriorate a signal output from the DUT as much as possible. However, since the XC connector includes a lens to generate collimated light, an optical component to obliquely change an optical path of the collimated light, and the like in addition to mechanical components, production thereof with high accuracy is very difficult. Thus, a measurement jig according to the present embodiment without an optical component will be described below. Note that an XC connector (optical communication connector), an electronic device (transmitter or receiver), a measuring instrument, and the like will also be described below.

Figure 1:
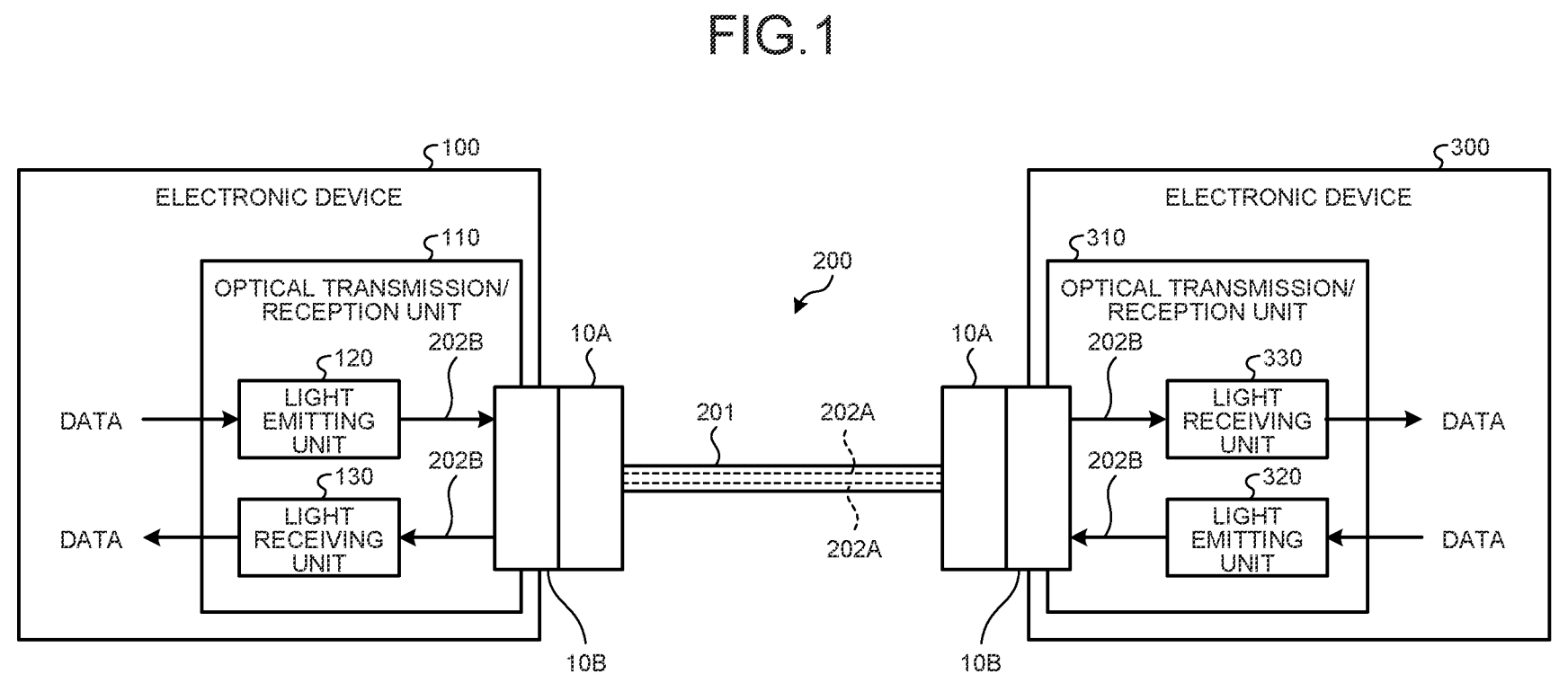

2. Embodiment 2-1. Configuration Example of an Electronic Device and an Optical Communication Cable A configuration example of a plurality of electronic devices 100 and 300 and an optical communication cable 200 according to the present embodiment will be described with reference to FIG. 1. FIG. 1 is a view illustrating an example of a schematic configuration of electronic devices 100 and 300 and an optical communication cable 200 according to the present embodiment.

As illustrated in FIG. 1, the electronic device 100 includes an optical transmission/reception unit 110. The optical transmission/reception unit 110 is configured to be capable of optical communication. In addition, the optical transmission/reception unit 110 includes a light emitting unit 120 of an optical signal, a light receiving unit 130 of an optical signal, and an optical communication connector 10B as a receptacle.

The optical transmission/reception unit 110 can transmit, as an optical signal, data transmission of which is required by the electronic device 100 and can receive an optical signal to the electronic device 100 via the optical communication connector 10B. The light emitting unit 120 outputs, as the optical signal, data to be transmitted in the electronic device 100, and performs an input thereof to the optical communication connector 10B via an optical transmission line 202B arranged on a distal end side of the light emitting unit 120. The light receiving unit 130 receives the optical signal from the optical communication connector 10B via the optical transmission line 202B, and is input as data to be received in the electronic device 100. Note that the detailed hardware configuration of the electronic device 100 is not specifically limited.

Similarly to the electronic device 100, the electronic device 300 also includes an optical transmission/reception unit 310. The optical transmission/reception unit 310 is configured to be capable of optical communication. In addition, the optical transmission/reception unit 310 includes a light emitting unit 320 of an optical signal, a light receiving unit 330 of an optical signal, and an optical communication connector 10B as a receptacle.

The optical transmission/reception unit 310 can transmit, as an optical signal, data transmission of which is required by the electronic device 300 and can receive an optical signal to the electronic device 300 via the optical communication connector 10B. The light emitting unit 320 outputs, as the optical signal, data to be transmitted in the electronic device 300, and performs an input thereof to the optical communication connector 10B via the optical transmission line 202B arranged on a distal end side of the light emitting unit 320. The light receiving unit 330 receives the optical signal from the optical communication connector 10B via the optical transmission line 202B, and is input as data to be received in the electronic device 300. Note that the detailed hardware configuration of the electronic device 300 is not specifically limited.

The optical communication cable 200 includes a cable body 201 and a plurality of optical communication connectors 10A. The optical communication cable 200 transmits the optical signal between the electronic device 100 and the electronic device 300 via the cable body 201 and each of the optical communication connectors 10A.

The cable body 201 includes an optical transmission line 202A therein. The optical transmission line 202A is, for example, an optical fiber. An outer peripheral surface of the optical transmission line 202A is appropriately covered. In addition, the optical communication connectors 10A are respectively connected to both ends of the optical transmission line 202A. Note that the optical transmission line 202A is not specifically limited as long as light can be transmitted, and may be other than the optical fiber.

In such a configuration, the electronic devices 100 and 300 can perform optical communication via the optical communication cable 200. Thus, each of the electronic devices 100 and 300 functions as a transmitter and a receiver. The optical communication cable 200 is used for connection for the optical communication between the electronic device 100 and the electronic device 300.

Here, each of the electronic devices 100 and 300 can be, for example, a mobile electronic device such as a mobile phone, a smartphone, a PHS, a PDA, a tablet PC, a laptop computer, a video camera, an IC recorder, a portable media player, an electronic organizer, an electronic dictionary, a calculator, or a portable game machine, or another electronic device such as a desktop computer, a display device, a television receiver, a radio receiver, a video recorder, a printer, a car navigation system, a game machine, a router, a hub, or an optical network unit (ONU). Alternatively, each of the electronic devices 100 and 300 can be included in a part or whole of an electric product such as a refrigerator, a washing machine, a watch, an intercom, an air conditioner, a humidifier, an air purifier, a lighting fixture, or a cooking fixture, or a vehicle.

<2-2. Configuration Example of an Optical Communication Connector>

Figure 2:
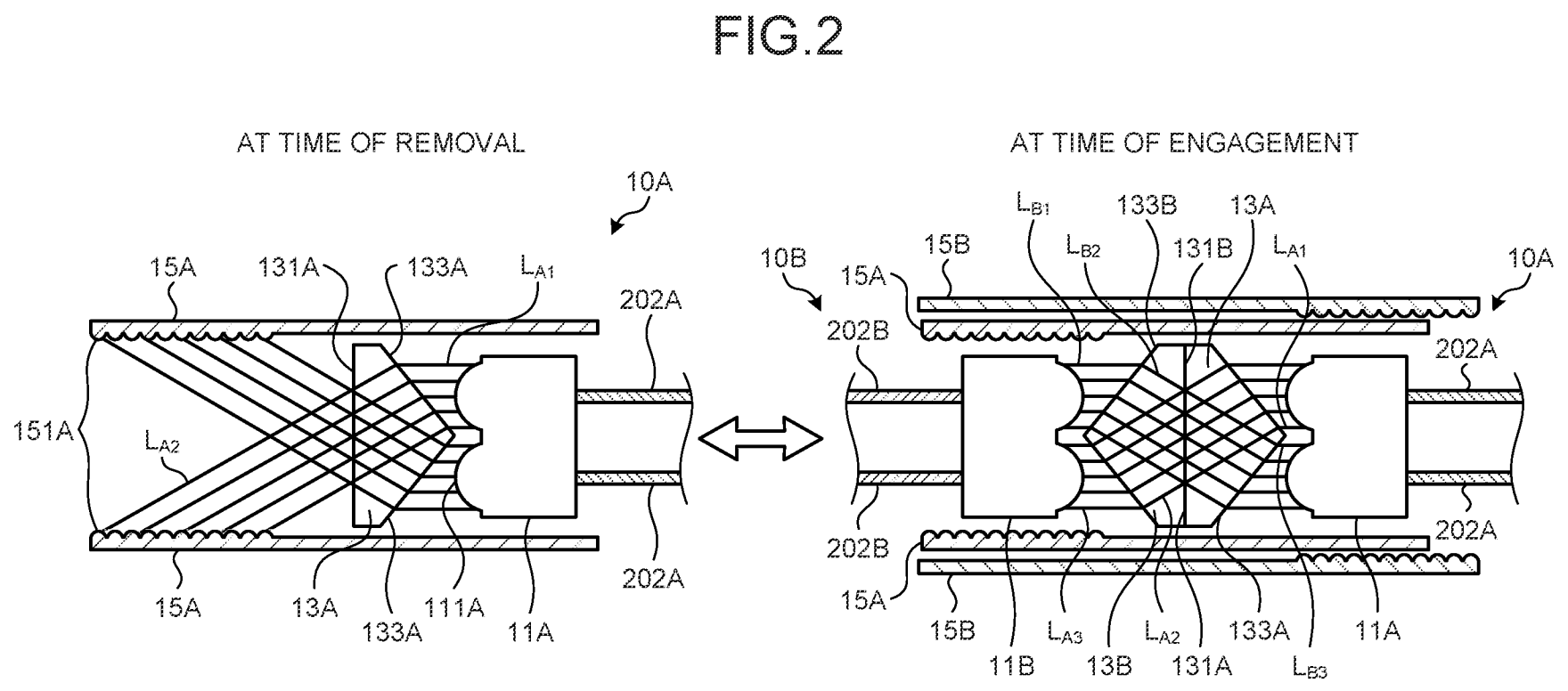

A configuration example of each of the optical communication connectors 10A and 10B according to the present embodiment will be described with reference to FIG. 2. FIG. 2 is a view (enlarged cross-sectional view at the time of removal and engagement) illustrating an example of a schematic configuration of each of the optical communication connectors 10A and 10B according to the present embodiment. Note that since the optical communication connectors 10A and 10B have a common configuration, the configuration of the optical communication connector 10A will be mainly described.

As illustrated in FIG. 2, the optical communication connector 10A mainly includes a lens portion 11A, a refraction portion 13A, and a scattering member 15A. The optical communication connector 10A is a plug provided on a distal end side (or terminal end side) of the cable body 201 (see FIG. 1). Note that the optical communication connector 10A may appropriately include a positioning member for positioning of each member, a protection member for protecting each member, a casing for carrying each member, and the like in addition to the above-described configuration.

The lens portion 11A is arranged in such a manner as to abut on the distal end side of the optical transmission line 202A in the cable body 201. In the collimator lens 111A on the distal end side, the lens portion 11A converts light of the optical signal emitted from the optical transmission line 202A into parallel light (collimated light) LA1 and performs emission thereof. On the other hand, when the parallel light enters the collimator lens 111A on the distal end side, the lens portion 11A collects the parallel light and performs emission thereof toward the optical transmission line 202A.

Note that although two collimator lenses 111A are illustrated in the example of FIG. 2, the illustrated aspect is not a limitation. The lens portion 11A may include any number (equal to or larger than 1) of collimator lenses according to the number of optical transmission lines 202A. For example, the lens portion 11A may be a microlens array in which collimator lenses are arrayed in a thickness direction and a width direction of the optical communication connector 10A. For example, the lens portion 11A may be a microlens array in which the collimator lenses are arrayed in two columns in the thickness direction (vertical direction in the drawing) and a plurality of rows in the width direction (depth direction in the drawing).

The refraction portion 13A is a prism configured and arranged to refract and emit the parallel light LA1 emitted from the lens portion 11A. The refraction portion 13A is arranged on the distal end side of the lens portion 11A. Furthermore, the refraction portion 13A is appropriately extended in the width direction (depth direction in the drawing) in such a manner as to be able to receive the parallel light LA1 from each collimator lens 111A arranged in the lens portion 11A. Note that the illustrated aspect is not a limitation. For example, in a case where three or more collimator lenses 111A are arranged or only one collimator lens 111A is arranged in the thickness direction, the refraction portion 13A can be extended or shortened in the thickness direction correspondingly.

In addition, the refraction portion 13A forms a flat surface 131A in such a manner that a surface on a distal end side thereof, that is, on an emission side of refracted light LA2 (described later) is substantially perpendicular to the parallel light LA1 emitted by the collimator lens 111A.

In addition, in the refraction portion 13A, an antireflection portion may be formed on the flat surface 131A on the distal end side. As a result, when the optical signal is received from the optical communication connector 10B, the optical signal can be efficiently incident on the refraction portion 13A. In addition, such an antireflection portion can be implemented by an antireflection film or a fine uneven structure having a period of less than 1 μm, such as a moth-eye structure.

In addition, a surface protection portion may be formed on the flat surface 131A on the distal end side of the refraction portion 13A. As a result, the refraction portion 13A is prevented from being unintentionally damaged, and the refracted light LA2 is more uniformly emitted, whereby quality of the optical signal is improved. Such a surface protection portion can be implemented by, for example, a transparent resin film such as an acrylic resin or a transparent film made of an inorganic material.

On the other hand, a proximal end side of the refraction portion 13A, that is, a surface on the incident side of the parallel light LA1 includes a plurality of refraction surfaces 133A having different incident angles with respect to the parallel light LA1. In the present embodiment, the surface on the proximal end side of the refraction portion 13A includes the two refraction surfaces 133A that are inclined to the distal end side from a center in the thickness direction toward an end side and that form a protruded portion. The parallel light LA1 is refracted by such a refraction surface 133A, become the refracted light LA2, and is emitted from the flat surface 131A.

In addition, angles of the two refraction surfaces 133A are adjusted in such a manner that pieces of the refracted light LA2 refracted by the two refraction surfaces 133A intersect near the center in the thickness direction. As described above, the parallel light LA1 is refracted in such a manner that the refracted light LA2 intersects, whereby reception of the refracted light LA2 of the optical communication connector 10B (described later) becomes easy. Furthermore, in the present embodiment, all pieces of the parallel light LA1 emitted by the one collimator lens 111A enter the same refraction surface 133A. As a result, since one optical signal travels through one optical path, that is, one optical signal is prevented from being integrated after being branched into a plurality of pieces, noise of the optical signal is reduced.

Furthermore, the refraction portion 13A can be made of a transparent resin material such as polycarbonate, a glass material such as BK7, synthetic quartz, anhydrous synthetic quartz, or alkali aluminosilicate, or other transparent inorganic material. Especially, polycarbonate is excellent in mechanical strength, processability, and transparency, and is suitable as a constituent material of the refraction portion 13A.

The scattering member 15A is two plate-like members arranged with the refraction portion 13A interposed therebetween. The scattering member 15A is arranged in such a manner that a surface on the distal end side of the scattering member 15A faces any one of the refraction surfaces 133A of the refraction portion 13A and the refracted light LA2 passing through the refraction portion 13A is emitted. In the present embodiment, the scattering member 15A is formed to be extended to the distal end side compared to the refraction portion 13A at an angle at which an intersection line of a flat surface including the refraction surface 133A and a flat surface including the inner surface of the scattering member 15A is parallel to a width direction of the optical communication connector 10A.

In addition, the scattering member 15A includes a scattering portion 151A that scatters the refracted light LA2 at a portion irradiated with the refracted light LA2. As a result, as illustrated in FIG. 2, the parallel light LA1 collimated by the collimator lens 111A is scattered by the scattering portion 151A when connection to the optical communication connector 10B is not made. As a result, the collimated parallel light LA1 and refracted light LA2 are prevented from being unintentionally radiated directly to the outside of the optical communication connector 10A.

The scattering portion 151A is not specifically limited as long as light is scattered, and can be, for example, a rough surface or a porous film such as an alumite layer. Specifically, the alumite layer can be easily and inexpensively formed, and is excellent in a light scattering property.

Although not specifically limited, a constituent material of the scattering member 15A may be, for example, a metal material. Note that in a case where the scattering portion 151A is the alumite layer, the scattering member 15A is made of aluminum.

The optical communication connector 10B is a receptacle arranged on a side surface of the electronic device 100. The optical communication connector 10B has a configuration substantially similar to that of the optical communication connector 10A described above. For example, the configurations of a lens portion 11B and the refraction portion 13B are substantially similar to those of the lens portion 11A and the refraction portion 13A. On the other hand, a scattering member 15B has a gap with respect to the lens portion 11B and the refraction portion 13B in such a manner that the distal end portion of the scattering member 15A can be inserted between the scattering member 15B and the lens portion 11B and the refraction portion 13B at the time of connection (at the time of engagement) with the optical communication connector 10A.

The configurations of the optical communication connectors 10A and 10B have been described above. As described above, in a case where the optical communication connectors 10A and 10B are not connected to each other by the refraction portions 13A and 13B and the scattering portions 151A and 151B, that is, at the time of non-optical coupling, the parallel light is prevented from being directly emitted to the outside of the optical communication connectors 10A and 10B. As a result, even in a case where intensity of the parallel light LA1 and LB1 generated by the collimator lenses 111A and 111B is relatively high, the parallel light LA1 and LB1 is prevented from directly entering, for example, eyeballs or the like of a user. Thus, unexpected health damage can be prevented.

In general, the intensity of the emitted light of the parallel light (laser light) is not deteriorated in principle. Thus, there is a risk that health hazard is generated when the laser light enters, for example, the eyeballs of the user. Thus, there is a standard that prescribes safety of laser products as an international standard (IEC 60825-1, and 2). It is easy for the optical communication connectors 10A and 10B to satisfy such international standards by the above-described refraction portions 13A and 13B and scattering portions 151A and 151B.

On the other hand, as illustrated in FIG. 2 and described below, when the optical communication connectors 10A and 10B are connected, the optical signal passing through the two refraction portions 13A and 13B become parallel light again, and optical coupling becomes possible.

As illustrated in FIG. 2, the optical communication connectors 10A and 10B are arranged in such a manner that the refraction portions 13A and 13B are symmetric and the flat surfaces 131A and 131B face each other at the time of connection (at the time of engagement). In this case, first, the light emitted from the optical transmission line 202A is collimated in the lens portion 11A and becomes the parallel light LA1. Then, the parallel light LA1 enters the refraction portion 13A, is refracted by the refraction surface 133A, and becomes the refracted light LA2. Then, the refracted light LA2 passes through the flat surface 131A and enters the refraction portion 13B from the flat surface 131B. The incident refracted light LA2 is refracted again on a refraction surface 133B and becomes parallel light LA3 parallel to the parallel light LA1. The parallel light LA3 is collected by the lens portion 11B and conveyed to the optical transmission line 202B.

Similarly, the light emitted from the optical transmission line 202B is collimated on the lens portion 11B and become parallel light LB1. Then, the parallel light LB1 enters the refraction portion 13B, is refracted by the refraction surface 133B, and becomes refracted light LB2. Then, the refracted light LB2 passes through the flat surface 131B and enters the refraction portion 13A from the flat surface 131A. The incident refracted light LB2 is refracted again on the refraction surface 133A and becomes parallel light LB3 parallel to the parallel light LB1. The parallel light LB3 is collected by the lens portion 11A and transmitted to the optical transmission line 202A. From the above, it becomes possible to bidirectionally transmit an optical signal between the electronic device 100 and the optical communication cable 200 via the optical communication connectors 10A and 10B.

In addition, in the optical communication connectors 10A and 10B, since the refraction portions 13A and 13B are arranged on the distal end side, the collimator lenses 111A and 111B and the optical transmission lines 202A and 202B are not exposed to the external environment. Thus, entry of dust and dirt into the optical transmission lines 202A and 202B and the collimator lenses 111A and 111B is prevented, and adhesion of oil and the like is prevented, whereby cleaning thereof becomes unnecessary, and maintainability is excellent. Furthermore, since the tip sides of the refraction portions 13A and 13B form the flat surfaces 131A and 131B, uncleanness such as dust and dirt is less likely to accumulate.

Furthermore, in the optical communication connectors 10A and 10B, the refraction portions 13A and 13B and the lens portions 11A and 11B, which are responsible for transmission of light between the optical transmission lines 202A and 202B, have the same shape. Thus, when manufacturing the optical communication connector set including the optical communication connector 10A and the optical communication connector 10B, it is possible to commonly manufacture components requiring high dimensional accuracy. Thus, the quality of optical coupling of such an optical communication connector set can be made high.

The optical communication connectors 10A and 10B in the above manner are excellent in maintainability and can perform collimated optical coupling. In addition, since the optical communication connectors 10A and 10B have no movable member for blocking parallel light, the mechanism is simple, and failure is less likely to be generated. Thus, the optical communication connectors 10A and 10B are suitable for consumer-use optical communication in which the optical communication cable 200 is inserted and removed relatively frequently.

<2-3. Configuration Example of a Measurement System>

A configuration example of a measurement system 500 according to the present embodiment will be described with reference to FIG. 3. FIG. 3 is a view illustrating an example of a schematic configuration of the measurement system 500 according to the present embodiment.

As illustrated in FIG. 3, the measurement system 500 includes a measurement target device (device under test (DUT)) 510, a measurement jig (fixture) 520, a connection cable 530, and a measuring instrument 540.

The measurement target device 510 includes the optical communication connector 10B described above. The measurement target device 510 corresponds to, for example, the electronic device 100, the electronic device 300, or the like.

The measurement jig 520 is a jig to measure an optical communication signal from the optical communication connector 10B. The measurement jig 520 includes a measurement connector 521. The measurement connector 521 is a plug provided on a distal end side of the measurement jig 520. The measurement connector 521 is fitted into and connected to the optical communication connector 10B of the measurement target device 510. Note that the measurement jig 520 will be described later in detail.

The connection cable 530 is a cable that connects the measurement jig 520 and the measuring instrument 540. The connection cable 530 may be formed integrally with the measurement jig 520, or may be formed to be connectable to another connection cable formed integrally with the measurement jig 520. The connection cable 530 is a cable that transmits an electric signal. As the connection cable 530, for example, a high frequency cable such as Sub Miniature Type A (SMA) is used.

The measuring instrument 540 measures power and a beam diameter of output light from the measurement target device 510, an inclination (angle of oblique emission) of the beam, and the like on the basis of an optical communication signal measured by the measurement jig 520.

<2-4. Configuration Example of a Measurement Target Device>

Figure 4:
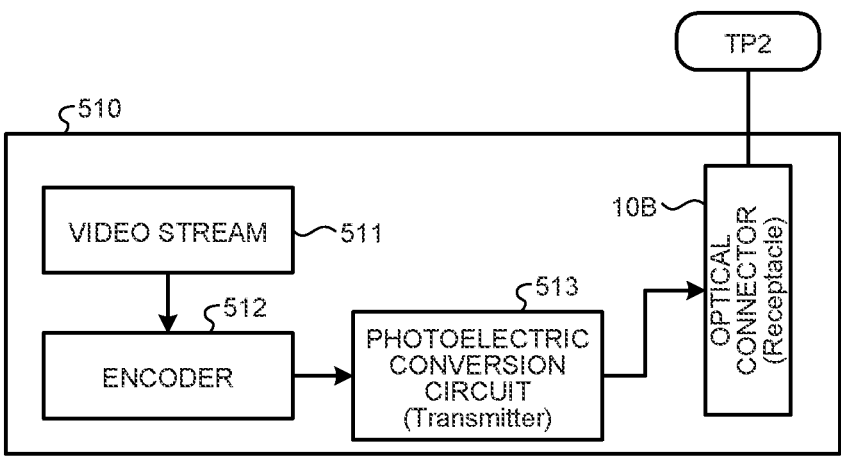
FIG. 4 is a view illustrating an example of a schematic configuration of a measurement target device according to the embodiment of the present disclosure.

A configuration example of the measurement target device 510 according to the present embodiment will be described with reference to FIG. 4. FIG. 4 is a view illustrating an example of a schematic configuration of the measurement target device 510 according to the present embodiment.

The measurement target device 510 includes a video stream 511, an encoder 512, and a photoelectric conversion circuit (transmitter) 513 in addition to the optical communication connector 10B described above. An optical communication signal observed from the optical communication connector 10B of the measurement target device 510, such as a test point 2 (TP2) is a measurement target. The measurement target device 510 corresponds to, for example, the above-described electronic device 100, electronic device 300, or the like.

The video stream 511 continuously performs transmission/reception and processing of video data. The encoder 512 executes encoding (such as conversion of a code into another format, or the like) of digital data such as video data, or digital conversion of an analog signal such as the video data. The photoelectric conversion circuit 513 converts digital data output from the encoder 512 into the optical communication signal. The encoder 512 and the photoelectric conversion circuit 513 correspond to, for example, the light emitting unit 120 and the light emitting unit 320 described above.

<2-5. Parameter Standard and Measurement Method>

Figure 5:
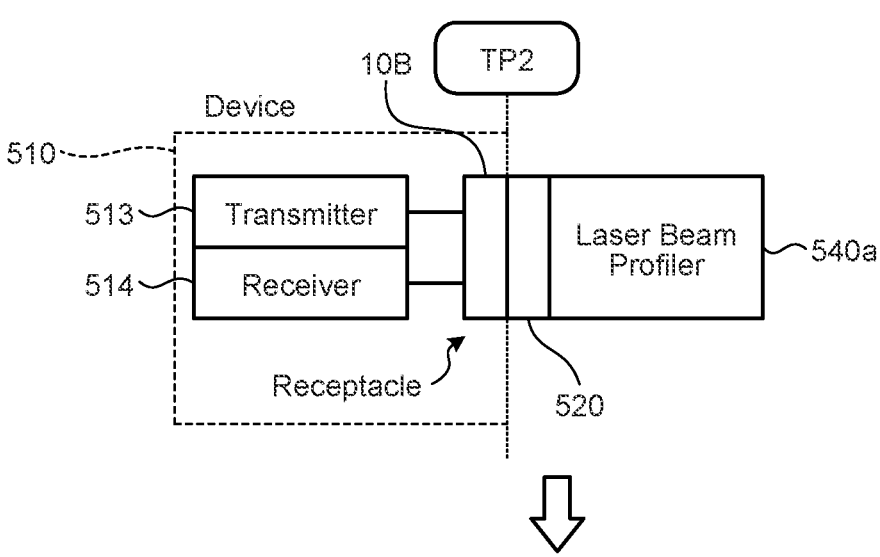
FIG. 5 is a first view illustrating an example of a parameter standard and a measurement method according to the embodiment of the present disclosure.

A parameter standard and a measurement method according to the present embodiment will be described with reference to FIG. 5 and FIG. 6. FIG. 5 and FIG. 6 are views respectively illustrating examples of the parameter standard and the measurement method according to the present embodiment.

(Collimated Beam Diameter)

As illustrated in FIG. 5, a laser beam profiler 540a is connected to the optical communication connector 10B of the measurement target device 510 via the measurement jig 520. The laser beam profiler 540a converts a communication optical signal received by the measurement jig 520 into an electrical signal, and measures a beam diameter, a power center position, optical power, and the like. The laser beam profiler 540a corresponds to, for example, the measuring instrument 540 described above. Note that in the example of FIG. 5, the measurement target device 510 also includes a receiver 514. The receiver 514 corresponds to, for example, the light receiving unit 130 and the light receiving unit 330 described above.

As illustrated in FIG. 5, for example, a beam diameter, beam parallelism, and beam misalignment of an output optical signal are prescribed as parameters prescribed in the standard. Measurement of such parameters is executed by the laser beam profiler 540a.

(Average Output Power Value)

As illustrated in FIG. 6, an optical power meter 540b is connected to the optical communication connector 10B of the measurement target device 510 via the measurement jig 520. The optical power meter 540b measures optical power and the like. The optical power meter 540b corresponds to, for example, the measuring instrument 540 described above. Note that similarly to the example of FIG. 5, the measurement target device 510 also includes the receiver 514 in the example of FIG. 6. The receiver 514 corresponds to, for example, the light receiving unit 130 and the light receiving unit 330 described above.

As illustrated in FIG. 6, for example, output power (such as average output power, peak output power, and the like) of the output optical signal is defined as a parameter prescribed in the standard. Measurement of such a parameter is executed by the optical power meter 540b.

<2-6. Light Emission of the Optical Communication Connector>

Figure 7:
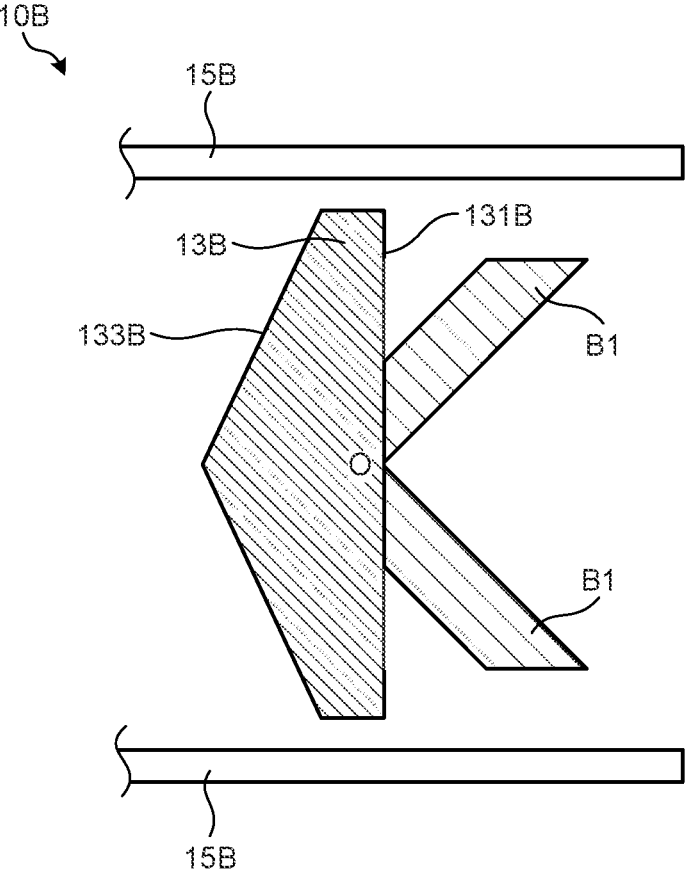
FIG. 7 is a view illustrating an example of light emission of the optical communication connector according to the embodiment of the present disclosure.

Light emission of the optical communication connector 10B according to the present embodiment will be described with reference to FIG. 7. FIG. 7 is a view illustrating an example of light emission of the optical communication connector 10B according to the present embodiment.

As illustrated in FIG. 7, in the optical communication connector 10B, the flat surface 131B at the distal end of the refraction portion 13B that is an optical component is an engagement surface. A light beam B1 is obliquely output from the engagement surface. The light beam B1 functions as the optical communication signal. A point O in FIG. 7 is an origin (output origin O) at which the light beam B1 is output. The light beam B1 corresponds to, for example, the bent light LB2 described above. Although not illustrated in FIG. 7, a structure in which a positioning pin serving as a mechanical origin is provided and engagement is made at a mechanically correct position is adopted.

<2-7. Configuration Example of a Measurement Connector>

Figure 8:
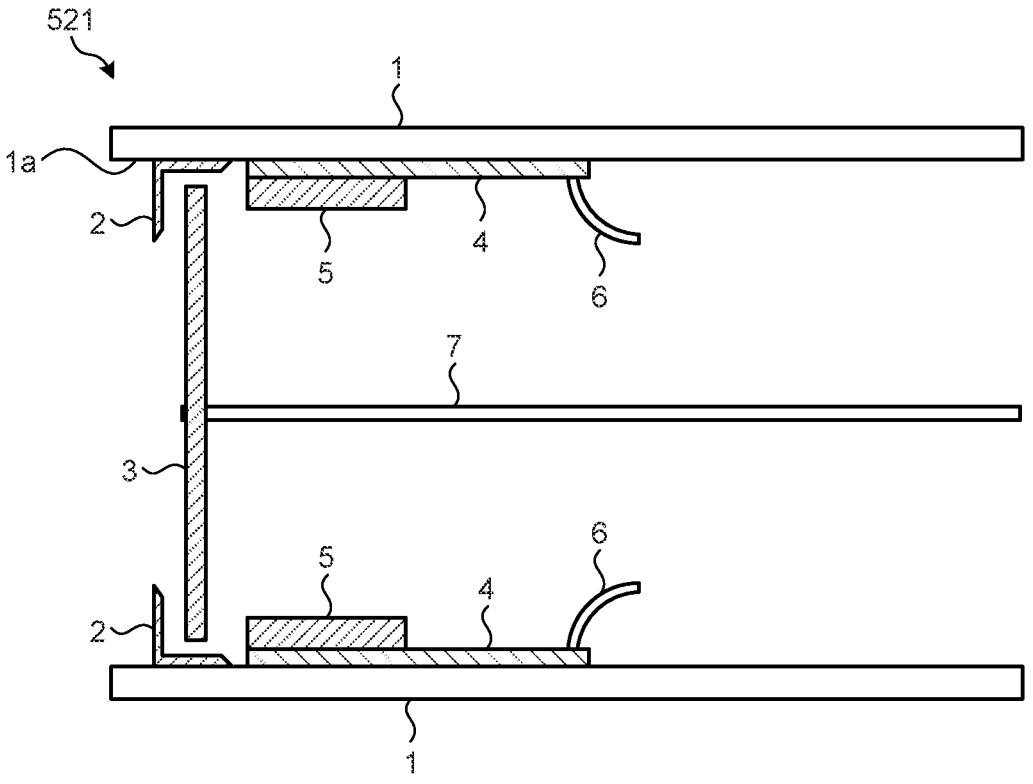
FIG. 8 is a first view illustrating an example of a schematic configuration of a measurement connector according to the embodiment of the present disclosure.
Figure 9:
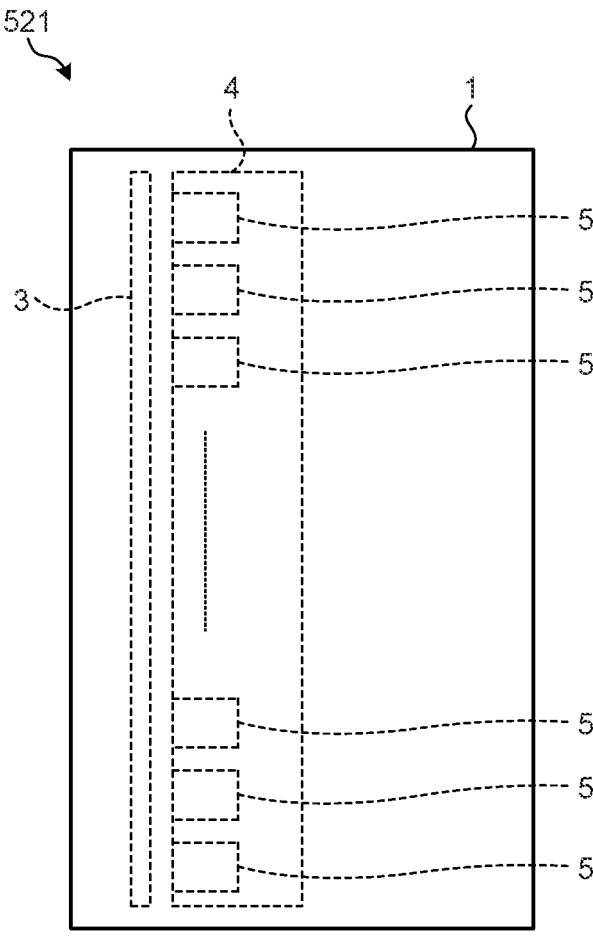
FIG. 9 is a second view illustrating an example of a schematic configuration of the measurement connector according to the embodiment of the present disclosure.
Figure 10:
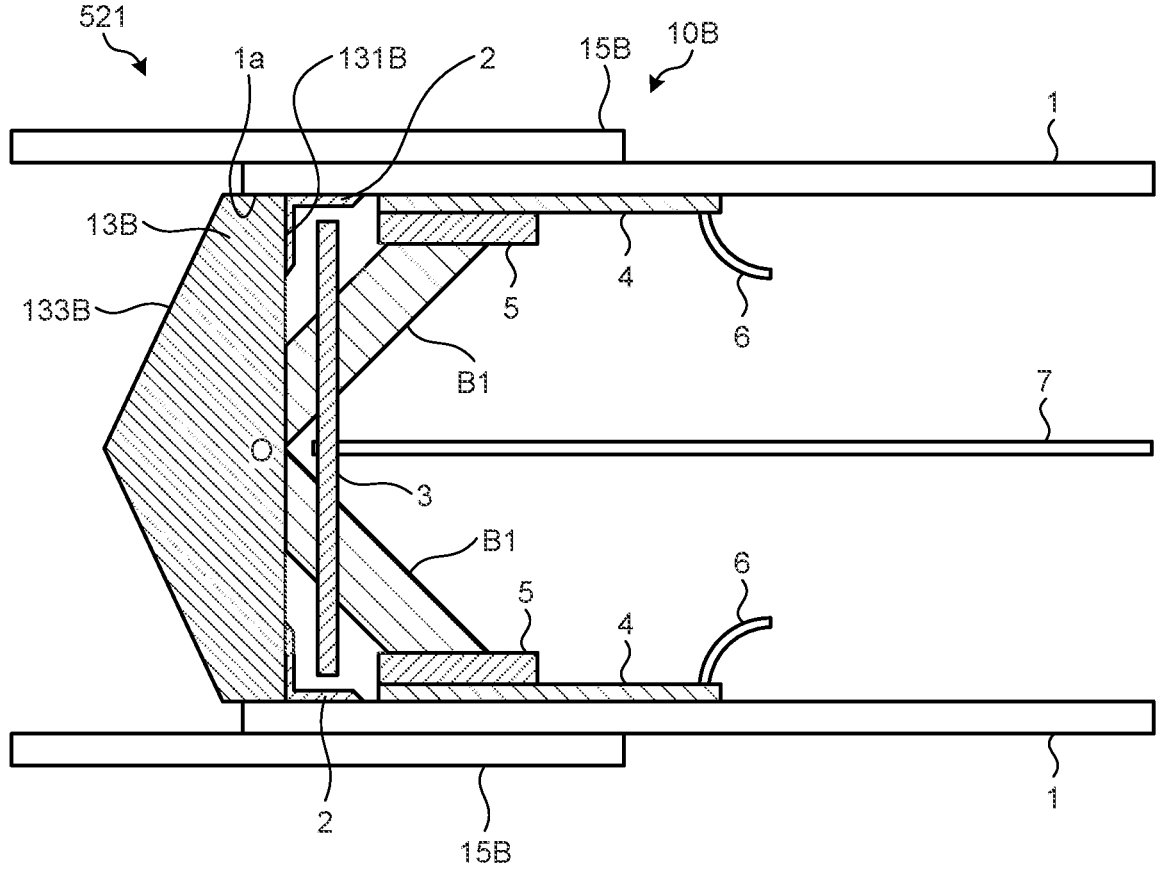
FIG. 10 is a view for describing an engagement state of the optical communication connector and the measurement connector according to the embodiment of the present disclosure.
Figure 11:
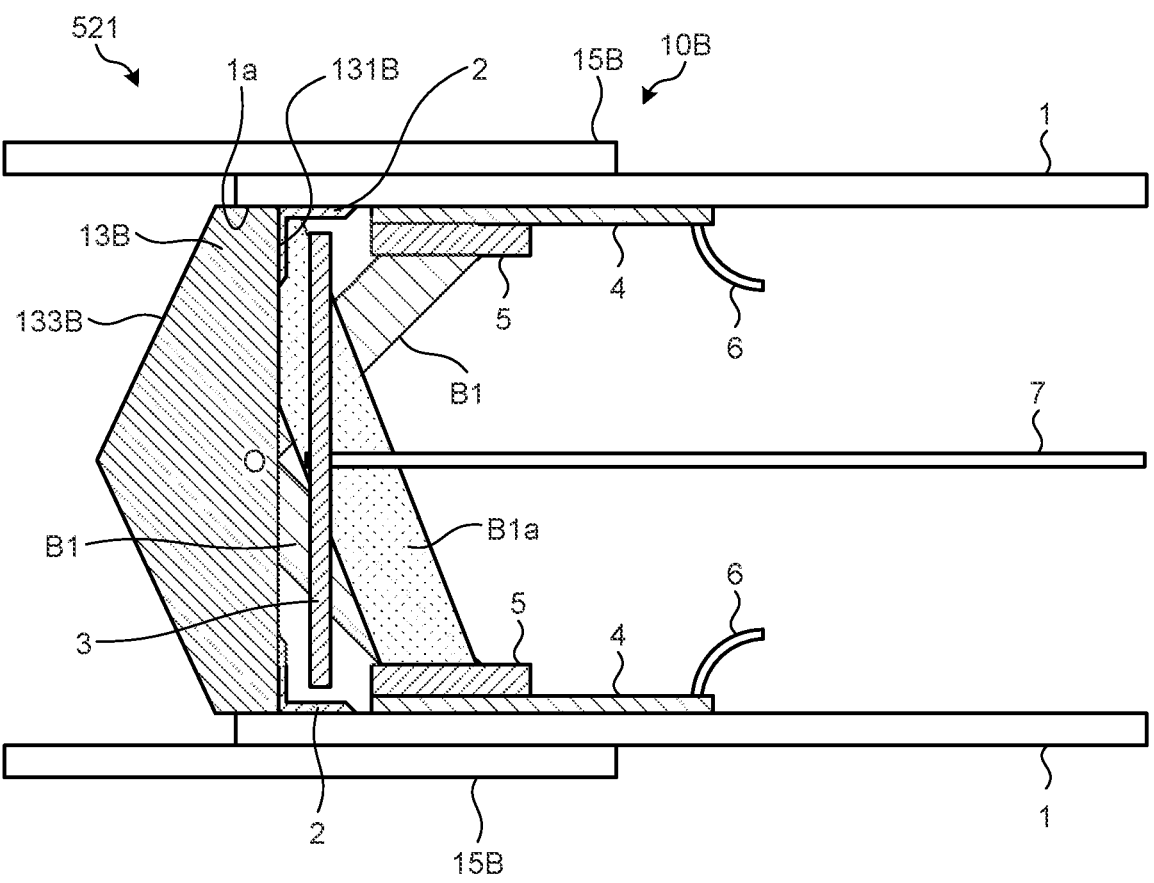
FIG. 11 is a view for describing a function of a shielding plate according to the embodiment of the present disclosure.

A configuration example of the measurement connector 521 according to the present embodiment will be described with reference to FIG. 8 to FIG. 11. FIG. 8 and FIG. 9 are views illustrating examples of a schematic configuration of the measurement connector 521 according to the present embodiment. FIG. 10 is a view for describing an engagement state of the optical communication connector 10B and the measurement connector 521 according to the present embodiment. FIG. 11 is a view for describing a function of a shielding plate 7 according to the present embodiment.

As illustrated in FIG. 8 and FIG. 9, the measurement connector 521 includes a housing 1, a plurality of positioning members 2, a transmission-type position sensor 3, a plurality of wiring boards 4, a plurality of optical detection elements 5, a plurality of wiring lines 6, and a shielding plate 7. Note that although not illustrated in FIG. 8, similarly to FIG. 7, a positioning hole into which a positioning pin serving as mechanical origin of the both is inserted is provided.

The housing 1 is an exterior for mechanical engagement with the optical communication connector 10B, and has an incident port 1a through which the light beam B1 enters. The housing 1 functions as a housing portion that houses each unit of the measurement connector 521, that is, each of the positioning members 2, the transmission-type position sensor 3, each of the wiring boards 4, each of the optical detection elements 5, each of the wiring lines 6, the shielding plate 7, and the like. Note that the housing 1 is formed in a rectangular parallelepiped shape, for example.

Each of the positioning members 2 is, for example, a spacer that abuts on a surface of an optical component, which is the engagement surface of the optical communication connector 10B, that is, the flat surface 131B at the distal end of the refraction portion 13B, and that determines a position of the bent portion 13B. These positioning members 2 are provided one each on inner surfaces, that is, an upper surface (first surface) and a lower surface (second surface) of the housing 1. The upper surface and the lower surface are parallel surfaces that are parallel to each other (such as parallel surfaces parallel to each other). Each of the positioning members 2 is provided at a distal end portion on a light incident side (left side in FIG. 8) of the housing 1. These positioning members 2 are formed in such a manner as not to block the light beam B1 emitted from the optical communication connector 10B (see FIG. 7) in a state in which the measurement connector 521 is engaged with the optical communication connector 10B. Note that the positioning member 2 is formed to have an L-shaped cross section, for example.

The transmission-type position sensor 3 is configured to be able to transmit light by a diffraction grating or the like, and is a sensor having a function of notifying a subsequent stage of a position, through which light is transmitted, as an electric signal. The transmission-type position sensor 3 is positioned and provided between the positioning members 2. The transmission-type position sensor 3 can detect that the light beam B1 is obliquely emitted from the optical communication connector 10B, that is, the flat surface 131B at the distal end of the refraction portion 13B with the output origin O as a reference. Note that the transmission-type position sensor 3 is formed in a rectangular plate shape, for example.

The wiring boards 4 respectively fix and hold the optical detection elements 5. These wiring boards 4 are provided one each on the inner surfaces, that is, the upper surface (first surface) and the lower surface (second surface) of the housing 1. Each of the wiring boards 4 is implemented by, for example, a printed board. Note that the wiring board 4 is formed in a rectangular plate shape, for example.

Each of the optical detection elements 5 is a sensor having a function of converting the optical communication signal into the electric signal and notifying a subsequent stage. These optical detection elements 5 are implemented by, for example, an element such as a charge coupled device (CCD). The optical detection elements 5 are respectively provided on the wiring boards 4. For example, as illustrated in FIG. 9, the optical detection elements 5 are arranged in a line in an extending direction of the transmission-type position sensor 3, that is, a longitudinal direction of the measurement connector 521.

Each of the wiring lines 6 is a wiring portion that transmits the electric signal output from the optical detection elements 5 to the subsequent stage. These wiring lines 6 are connected to, for example, the connection cable 530, and transmit the electric signals output from the optical detection elements 5 to the measuring instrument 540. Note that a wiring line (not illustrated) is also connected to the transmission-type position sensor 3. This wiring line is also connected to, for example, the connection cable 530, and transmits an electric signal output from the transmission-type position sensor 3 to the measuring instrument 540.

The shielding plate 7 blocks light traveling at a sharp angle (sharp oblique light), that is, the light beam B1 an emission angle of which exceeds a predetermined threshold. The shielding plate 7 is positioned, for example, between the optical detection elements 5 facing each other, and is provided at a height position of ½ of the housing 1. The shielding plate 7 is implemented by various shielding plates, and may be realized by, for example, a diffusion plate that diffuses light, an absorption plate that absorbs light, or the like. Note that the shielding plate 7 is formed in a rectangular plate shape, for example.

According to such a configuration, it is necessary to secure accuracy by abutment between the positioning members 2 and the flat surface 131B at the distal end of the refraction portion 13B. However, since the positioning members 2 can be manufactured by a sheet metal or the like, it is possible to easily secure accuracy by a simple sheet metal. In addition, since each of the optical detection elements 5 is also provided on the parallel surfaces, mounting of the optical detection elements 5 is also easy. Furthermore, when the optical detection elements 5 have a sufficient size, positional accuracy thereof is not required, whereby the accuracy can be easily secured. Note that although a final incident angle will be described later, since measurement can be performed with the measured values in the optical detection elements 5, high accuracy is not required for the transmission-type position sensor 3. For these reasons, the measurement jig 520 does not require a highly accurate component, and it is easy to mount individual devices. As a result, it is possible to design the inexpensive measurement jig 520 with almost no adverse effect on the signal output from the optical communication connector 10B of the measurement target device 510.

When such a measurement jig 520 is attached to the optical communication connector 10B, the optical communication connector 10B and the measurement connector 521 are engaged as illustrated in FIG. 10. In this state, when being obliquely output from the flat surface 131B at the distal end of the refraction portion 13B, the light beam B1 passes through the transmission-type position sensor 3 and enters the corresponding optical detection element 5.

At this time, as illustrated in FIG. 11, the optical path of the original light beam B1 is prescribed to be generated from the output origin O. However, there is a possibility that a light beam B1a (sharp oblique light) taking an optical path of a region filled with dots in FIG. 11 is determined as a correct position by the transmission-type position sensor 3. Thus, the shielding plate 7 is provided in such a manner as to be in contact with the transmission-type position sensor 3 between the upper optical detection element 5 and the lower optical detection element 5, and the light beam B1a traveling at a sharp angle is prevented from reaching the lower optical detection element 5. Similarly, in the upper optical detection element 5, the shielding plate 7 prevents incidence of the light beam B1a traveling at the sharp angle.

<2-8. Modification Example of the Measurement Connector>

Figure 12:
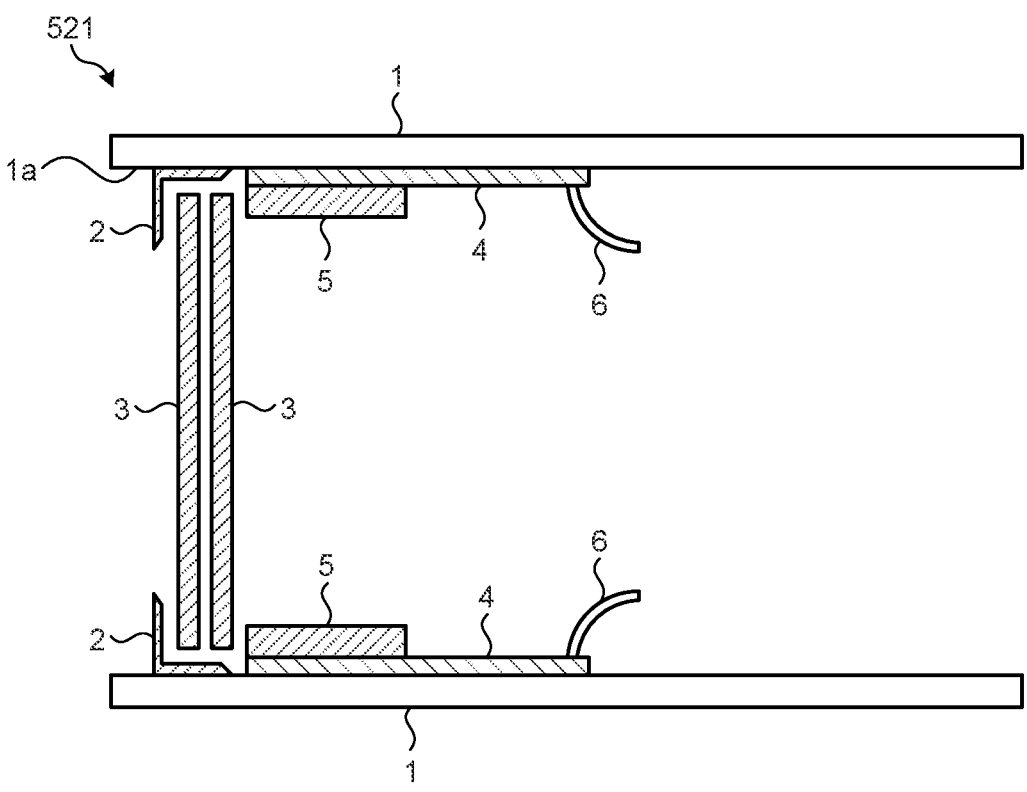
FIG. 12 is a view illustrating an example of a schematic configuration of a modification example of the measurement connector according to the embodiment of the present disclosure.

A modification example of the measurement connector 521 according to the present embodiment will be described with reference to FIG. 12. FIG. 12 is a view illustrating an example of a schematic configuration of the modification example of the measurement connector 521 according to the present embodiment.

As illustrated in FIG. 12, a measurement connector 521 includes another transmission-type position sensor 3, that is, a plurality of the transmission-type position sensors 3 instead of the shielding plate 7 (see FIG. 8). As described above, each of the transmission-type position sensors 3 can detect that a light beam B1 is obliquely emitted from a flat surface 131B at a distal end of a refraction portion 13B. The two or more transmission-type position sensors 3 are arranged along an optical path, and are provided, for example, in parallel to each other. This makes it possible to acquire an emission angle of the light beam B1 on the basis of a position where the light beam B1 passes through each of the transmission-type position sensors 3. Furthermore, for example, by acquiring an emission angle of a light beam B1a in FIG. 11, that is, the light beam B1a that enters a lower optical detection element 5 at a sharp angle, it is possible not to use the light beam B1a as a measured value in a case where the emission angle is larger than a predetermined threshold. Note that the same applies to an upper optical detection element 5.

Although the positioning members 2, the transmission-type position sensor 3, the optical detection elements 5, the shielding plate 7, and the like are provided in the housing 1 in the measurement connector 521 as the example in the above-described embodiment (or modification example), this is not a limitation. For example, it is only necessary to provide at least the optical detection element 5 according to the configuration of the optical communication connector 10B. In addition to the optical detection element 5, any one or more of the positioning member 2, the transmission-type position sensor 3, or the shielding plate 7 may be appropriately provided. As described above, the configuration of the measurement connector 521 can be appropriately changed according to the configuration of the optical communication connector 10B.

In addition, although the plurality of optical detection elements 5 is provided according to the number of optical paths (the number of pieces of emitted light) emitted from the measurement connector 521 in the above-described embodiment (or modification example), this is not a limitation. For example, the optical detection elements may be replaced with one optical detection element 5 having a large size. Furthermore, one transmission-type position sensor 3 may be replaced with a plurality of transmission-type position sensors 3 having a small size according to the number of optical paths emitted from the measurement jig 520.

<2-9. Configuration Example of a Measuring Instrument>

Figure 13:
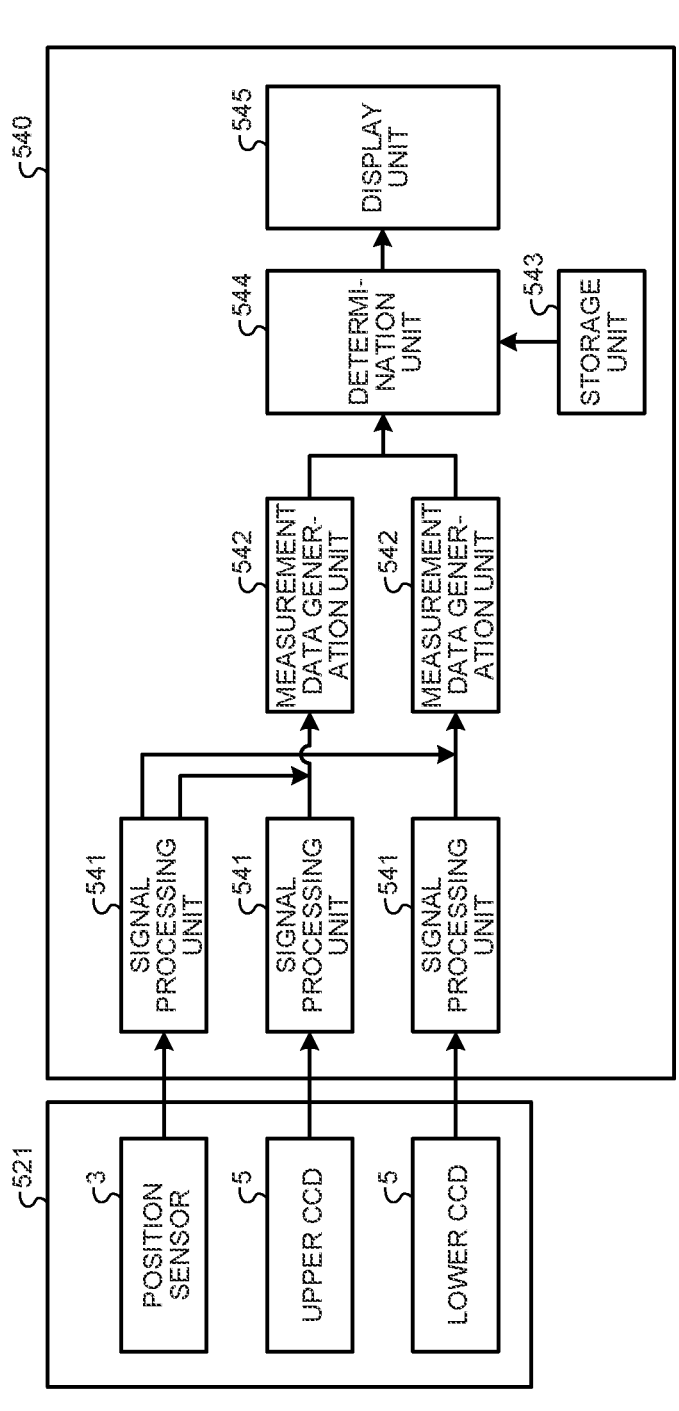
FIG. 13 is a view illustrating an example of a schematic configuration of a measuring instrument according to the embodiment of the present disclosure.

A configuration example of the measuring instrument 540 according to the present embodiment will be described with reference to FIG. 13. FIG. 13 is a view illustrating an example of a schematic configuration of the measuring instrument 540 according to the present embodiment. In the example of FIG. 13, a measurement system that presents a measurement result from an output signal of the measurement connector 521 is illustrated.

As illustrated in FIG. 13, the measuring instrument 540 includes a plurality of signal processing units 541, a plurality of measurement data generation units 542, a storage unit 543, a determination unit 544, and a display unit 545. Note that as described above, the measurement connector 521 of the measurement jig 520 includes the transmission-type position sensor 3, the upper optical detection element 5 (such as upper CCD), and the lower optical detection element 5 (such as lower CCD).

Each of the signal processing units 541 processes an electric signal output from the transmission-type position sensor 3, the upper optical detection element 5, or the lower optical detection element 5. Each of the measurement data generation units 542 generates measurement data related to an output light beam (light beam B1) up and down on the basis of the information from the transmission-type position sensor 3 and the measured value from the optical detection element 5. The storage unit 543 stores a prescribed value prescribed in the standard, and information such as a value and a position to be observed by the optical detection element 5 which information is calculated from an allowable range thereof. The determination unit 544 collates each piece of information stored in the storage unit 543 with actual measurement data and generates a determination result. The display unit 545 displays the determination result by the determination unit 544.

Note that each of the functional units such as the signal processing unit 541, the measurement data generation unit 542, and the determination unit 544 described above may include both or either one of hardware and software. These configurations are not specifically limited. For example, each of the functional units may be implemented by a computer such as a central processing unit (CPU) or a micro processing unit (MPU) executing a program stored in advance in a read only memory (ROM) by using a random access memory (RAM) or the like as a work area. Also, each of the functional units may be implemented by, for example, an integrated circuit such as an application specific integrated circuit (ASIC) or a field programmable gate array (FPGA).

Furthermore, the storage unit 543 is implemented by, for example, a storage device such as a flash memory or a RAM. The display unit 545 is implemented by, for example, a display device such as a liquid crystal display or an organic electro-luminescence (EL) display. Since various kinds of information are displayed by the display unit 545, a measurer can visually recognize the various kinds of information.

In such a configuration, the electric signals output from the transmission-type position sensor 3, the upper optical detection element 5, and the lower optical detection element 5 are processed by the signal processing unit 541. Then, the measurement data related to each of the upper and lower output light beams (light beams B1) is generated by each of the measurement data generation units 542 on the basis of the information from the transmission-type position sensor 3 and the measured value from each of the optical detection elements 5. The determination unit 544 collates and determines each piece of information stored in the storage unit 543 with the actual measurement data, and the determination result is displayed on the display unit 545.

<2-10. Modification Example of the Measuring Instrument>

Figure 14:
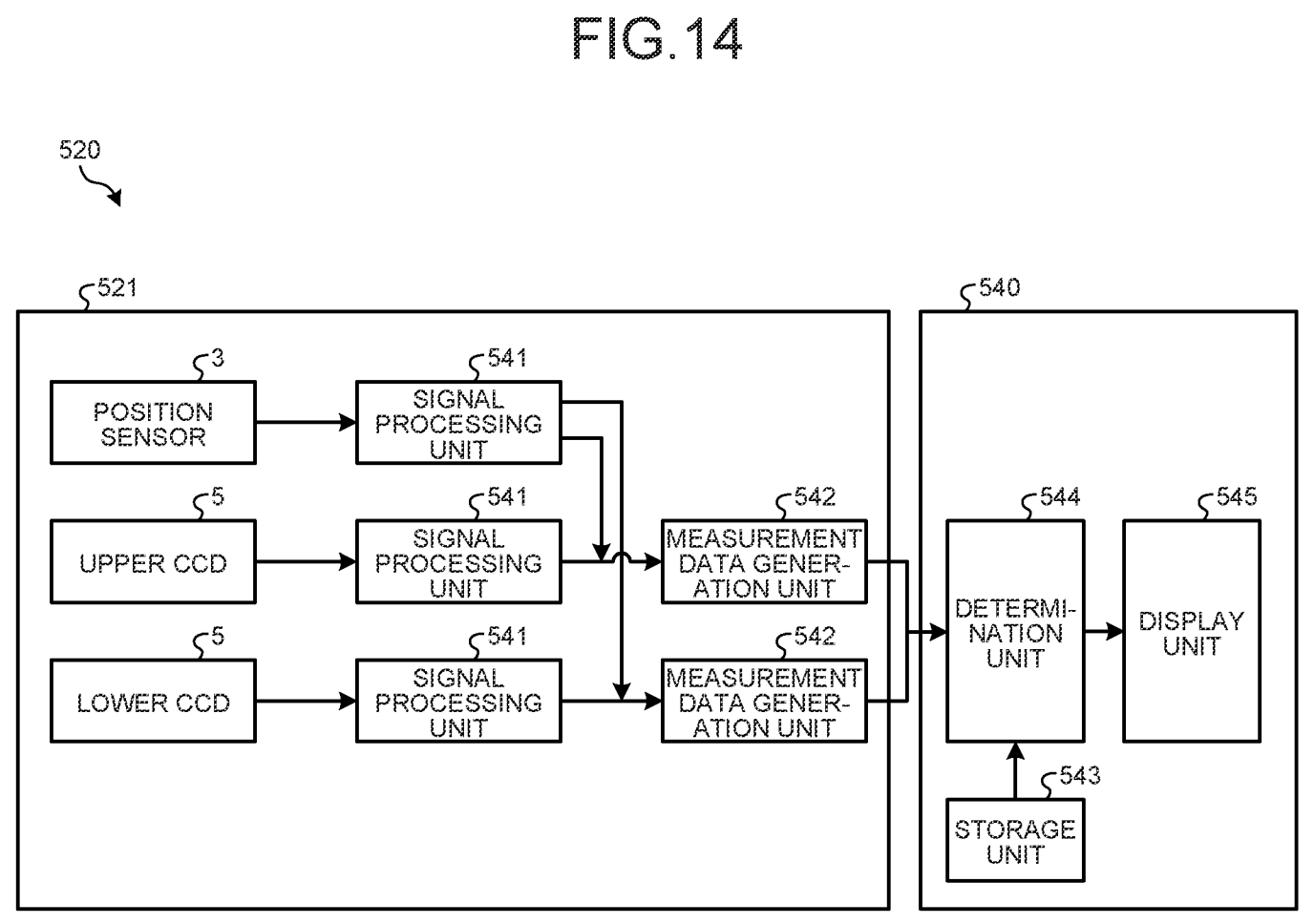

A modification example of the measuring instrument 540 according to the present embodiment will be described with reference to FIG. 14. FIG. 14 is a view illustrating an example of a schematic configuration of the modification example of the measuring instrument 540 according to the present embodiment. In the example of FIG. 14, a measurement system that presents a measurement result from an output signal of a measurement connector 521 is illustrated.

As illustrated in FIG. 14, a measuring instrument 540 includes a storage unit 543, a determination unit 544, and a display unit 545. In this case, a measurement connector 521 of a measurement jig 520 includes a plurality of signal processing units 541 and a plurality of measurement data generation units 542 in addition to a transmission-type position sensor 3, an upper optical detection element 5 (such as an upper CCD), and a lower optical detection element 5 (such as a lower CCD). In the example of FIG. 14, each of the signal processing units 541 and each of the measurement data generation units 542 of the example of FIG. 13 are provided in the measurement connector 521. For example, each of the signal processing units 541 and each of the measurement data generation units 542 are provided on a wiring board 4 of the measurement connector 521.

Note that although both the signal processing units 541 and the measurement data generation units 542 are provided in the measurement connector 521 in the example of FIG. 14, this is not a limitation. For example, one of each of the signal processing units 541 or each of the measurement data generation units 542 may be provided in the measurement connector 521. In this case, the other is provided in the measuring instrument 540.

<2-11. Measured Value of an Optical Detection Element>

Figure 15:
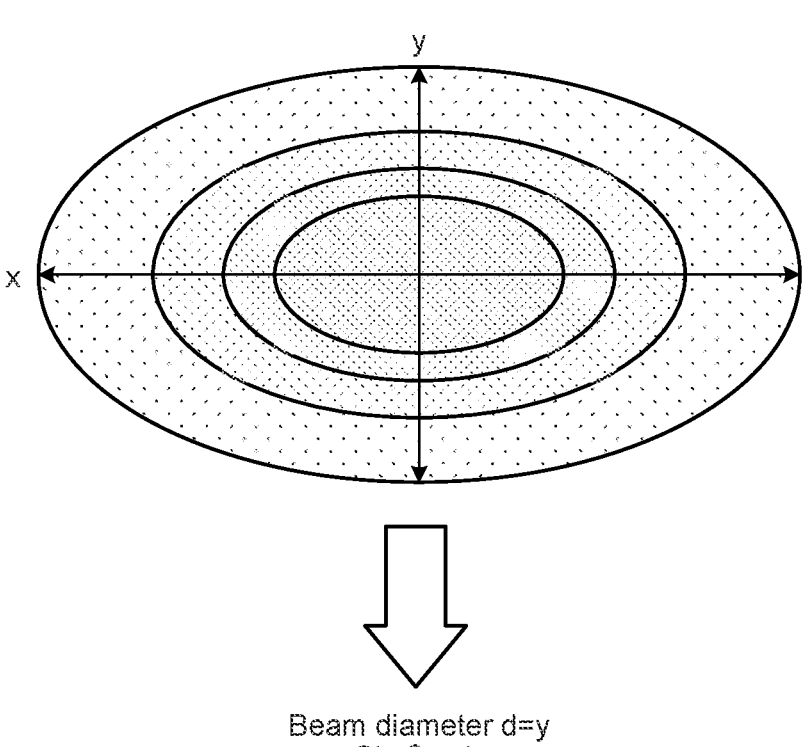
FIG. 15 is a view illustrating an example of a measured value of an optical detection element according to the embodiment of the present disclosure.

Measured values of the optical detection elements 5 according to the present embodiment will be described with reference to FIG. 15. FIG. 15 is a view illustrating an example of the measured values (detection values) of the optical detection element 5 according to the present embodiment.

A planar shape of the light beam B1 incident on each of the optical detection element 5 is an elliptical shape as illustrated in FIG. 15. In the example of FIG. 15, in the measured value of the light beam B1, density of dots (color density) indicates power intensity. The power measurement value is calculated for each of the optical detection elements 5.

An optical signal output from the optical communication connector 10B (receptacle) is collimated light (parallel light). Thus, the above beam parallelism is kept high, and the light travels while keeping substantially the same diameter even when being relatively away. Thus, y that is the measured value in FIG. 15 is determined with addition of tolerance according to prescription of the beam parallelism to a beam diameter of a standard value on the basis of an optical path distance from the output origin O to the measurement point (optical detection element 5).

In the example of FIG. 15, the beam diameter d is expressed by $d=y$. Furthermore, an emission angle $\theta$ from the output origin O is expressed by $Sin\theta=y/x$. In addition, output power is calculated by addition of a loss due to transmission through the transmission-type position sensor 3 from an addition value of all power received by the optical detection element 5. At the same time, a beam misalignment is also measured from a difference in position between the beam center and the beam center of the standard on the optical detection element 5 converted from a reference origin. Note that the addition value of the power is preferably calculated in consideration of transmittance of the transmission-type position sensor 3.

<2-12. Effects>

As described above, according to the present embodiment, the measurement connector 521 of the measurement jig 520 includes the housing 1 that can be attached to the optical communication connector 10B of the measurement target device 510, and the optical detection element 5 that is provided in the housing 1 and detects the light (such as the light beam B1) emitted from the optical communication connector 10B. This eliminates the need for expensive optical components and high machine accuracy, whereby the cost of the measurement jig 520 can be reduced.

Furthermore, a plurality of the optical detection elements 5 may be provided. As a result, even in a case where there is a plurality of pieces of emitted light emitted from the optical communication connector 10B, the light can be detected in accordance with the number of pieces of emitted light.

In addition, the optical detection elements 5 may be arranged in a line. As a result, even in a case where there is a plurality of pieces of emitted light emitted from the optical communication connector 10B and emission positions thereof are arranged in a line, it is possible to detect the light in accordance with the number of pieces of emitted light.

In addition, the plurality of optical detection elements 5 may be provided according to the number of pieces of light emitted from the optical communication connector 10B. As a result, even in a case where there is a plurality of pieces of emitted light emitted from the optical communication connector 10B, all pieces of the emitted light can be detected in accordance with the number of pieces of emitted light.

In addition, each of the optical detection elements 5 may be provided on the first surface (such as the upper surface) of the housing 1 and the second surface (such as the lower surface) facing the first surface. As a result, light emitted from the optical communication connector 10B toward the first surface and the second surface of the housing 1 can be securely detected.

In addition, the measurement connector 521 may further include the shielding plate 7 that is provided between the first surface and the second surface and that blocks the light emitted from the optical communication connector 10B. As a result, for example, light (such as the light beam B1$a$: see FIG. 11) traveling from the upper portion of the optical communication connector 10B toward the optical detection element 5 on the second surface is blocked by the shielding plate 7, whereby the light can be prevented from reaching the optical detection element 5 on the second surface. Similarly, since light traveling from the lower portion of the optical communication connector 10B toward the optical detection element 5 on the first surface is also blocked by the shielding plate 7, it is possible to prevent the light from reaching the optical detection element 5 on the first surface.

In addition, the shielding plate 7 may block light emitted from the optical communication connector 10B at the emission angle θ exceeding the predetermined threshold. As a result, the light traveling at the emission angle θ exceeding the predetermined threshold can be securely blocked.

In addition, the measurement connector 521 may further include the transmission-type position sensor 3 that detects the light emitted from the optical communication connector 10B. As a result, it is possible to easily detect that light is obliquely emitted from the optical communication connector 10B.

In addition, the transmission-type position sensor 3 may be a sensor to detect that the light emitted from the optical communication connector 10B obliquely travels. As a result, it is possible to easily and securely detect that the light emitted from the optical communication connector 10B travels obliquely.

In addition, the transmission-type position sensor 3 may be provided on the light incident side of the optical detection element 5 in the housing 1. As a result, it is possible to detect that the light is obliquely emitted from the optical communication connector 10B before the light emitted from the optical communication connector 10B enters the optical detection element 5.

Furthermore, a plurality of the transmission-type position sensors 3 may be provided along the optical path of the light emitted from the optical communication connector 10B. As a result, it is possible to calculate the emission angle θ of the light beam B1 emitted from the optical communication connector 10B on the basis of the position in which the light beam B1 passes through each of the transmission-type position sensors 3.

In addition, each of the transmission-type position sensors 3 may be a sensor to detect the emission angle θ of the light emitted from the optical communication connector 10B. As a result, the emission angle θ of the light beam B1 can be securely calculated.

In addition, the measurement connector 521 may further include the positioning member 2 that abuts on the optical component (such as the refraction portion 13B) in the optical communication connector 10B and that determines the position of the optical detection element 5 with respect to the optical member. As a result, since the optical detection element 5 is accurately positioned with respect to the optical component, the light emitted from the optical communication connector 10B can be securely detected.

Furthermore, a plurality of the positioning members 2 may be provided. As a result, the optical detection element 5 can be more accurately positioned with respect to the optical component.

In addition, each of the positioning members 2 may be provided on the first surface (such as the upper surface) of the housing 1 and the second surface (lower surface) facing the first surface. As a result, the optical detection element 5 can be more accurately and securely positioned with respect to the optical component.

In addition, the measurement connector 521 may further include the signal processing unit 541 that processes the electric signal output from the optical detection element 5. As a result, since the measurement connector 521 can process the electrical signal output from the optical detection element 5, the functions of the measurement connector 521 can be increased.

In addition, the measurement connector 521 may further include the measurement data generation unit 542 that generates measurement data on the basis of a detection result of the optical detection element 5. As a result, since the measurement connector 521 can generate the measurement data based on the detection result of the optical detection element 5, the functions of the measurement connector 521 can be increased.

In addition, the measurement connector 521 may further include the measurement data generation unit 542 that generates measurement data on the basis of detection results of the optical detection element 5 and the transmission-type position sensor 3. As a result, since the measurement connector 521 can generate the measurement data based on the detection results of the optical detection element 5 and the transmission-type position sensor 3, the functions of the measurement connector 521 can be increased.

3. Other Embodiments

The processing according to the above-described embodiments (or modification examples) may be performed in various different forms (modification examples) other than the above-described embodiments. For example, among the pieces of processing described in the above embodiments, a whole or part of the processing described to be automatically performed can be manually performed, or a whole or part of the processing described to be manually performed can be automatically performed by a known method. In addition, the processing procedures, specific names, and information including various kinds of data or parameters described in the above document or in the drawings can be arbitrarily changed unless otherwise specified. For example, various kinds of information illustrated in each of the drawings are not limited to the illustrated information.

In addition, each component of each of the illustrated devices is a functional concept, and does not need to be physically configured in the illustrated manner. That is, a specific form of distribution/integration of each device is not limited to what is illustrated in the drawings, and a whole or part thereof can be functionally or physically distributed/integrated in an arbitrary unit according to various loads and usage conditions.

Also, the above-described embodiments (or modification examples) can be arbitrarily combined in a range in which the processing contents do not contradict with each other. Also, the effect described in the present description is merely an example and is not a limitation, and there may be another effect.

4. Appendix

Note that the present technology can also have the following configurations.

(1)
A measurement connector comprising:
a housing attachable to an optical communication connector of a measurement target device; and
an optical detection element that is provided in the housing and detects light emitted from the optical communication connector.

(2)
The measurement connector according to (1), wherein a plurality of the optical detection elements is provided.

(3)
The measurement connector according to (2), wherein the plurality of optical detection elements is arranged in a line.

(4)
The measurement connector according to (2) or (3), wherein
the plurality of optical detection elements is provided in accordance with a number of pieces of the light emitted from the optical communication connector.

(5)
The measurement connector according to any one of (2) to (4), wherein
the plurality of optical detection elements is provided on a first surface of the housing and a second surface facing the first surface.

(6)
The measurement connector according to (5), further comprising
a shielding plate that is provided between the first surface and the second surface and blocks the light emitted from the optical communication connector.

(7)
The measurement connector according to (6), wherein the shielding plate blocks the light emitted from the optical communication connector at an emission angle exceeding a predetermined threshold.

(8)
The measurement connector according to any one of (1) to (7), further comprising
a transmission-type position sensor that detects the light emitted from the optical communication connector.

(9)
The measurement connector according to (8), wherein the transmission-type position sensor is a sensor to detect that the light emitted from the optical communication connector travels obliquely.

(10)
The measurement connector according to (8) or (9), wherein
the transmission-type position sensor is provided on an incident side of the light compared to the optical detection element in the housing.

(11)
The measurement connector according to any one of (8) to (10), wherein
a plurality of the transmission-type position sensors is provided along an optical path of the light emitted from the optical communication connector.

(12)
The measurement connector according to (11), wherein the plurality of transmission-type position sensors is sensors to detect an emission angle of the light emitted from the optical communication connector.

(13)
The measurement connector according to any one of (1) to (12), further comprising
a positioning member that abuts on an optical component in the optical communication connector and determines a position of the optical detection element with respect to the optical member.

(14)
The measurement connector according to (13), wherein a plurality of the positioning members is provided.

(15)
The measurement connector according to (14), wherein the plurality of positioning members is provided on a first surface of the housing and a second surface facing the first surface.

(16)
The measurement connector according to any one of (1) to (15), further comprising
a signal processing unit that processes an electric signal output from the optical detection element.

(17)
The measurement connector according to any one of (1) to (16), further comprising
a measurement data generation unit that generates measurement data on a basis of a detection result by the optical detection element.

(18)
The measurement connector according to any one of (8) to (12), further comprising
a measurement data generation unit that generates measurement data on a basis of detection results of the optical detection element and the transmission-type position sensor.

(19)
A measurement jig comprising:
a measurement connector, wherein
the measurement connector includes
a housing attachable to an optical communication connector of a measurement target device, and
an optical detection element that is provided in the housing and detects light emitted from the optical communication connector.

(20)
A measurement system comprising:
a measurement jig having a measurement connector; and
a measurement data generation unit, wherein
the measurement connector includes
a housing attachable to an optical communication connector of a measurement target device, and an optical detection element that is provided in the housing and detects light emitted from the optical communication connector, and the measurement data generation unit generates measurement data on a basis of a detection result of the optical detection element.

(21)

A measurement jig including the measurement connector according to any one of (1) to (18).

(22)

A measurement system including a measurement jig that includes the measurement connector according to any one of (1) to (18).

REFERENCE SIGNS LIST

1 HOUSING
2 POSITIONING MEMBER
3 TRANSMISSION-TYPE POSITION SENSOR
4 WIRING BOARD
5 OPTICAL DETECTION ELEMENT
6 WIRING LINE
7 SHIELDING PLATE
10A OPTICAL COMMUNICATION CONNECTOR
10B OPTICAL COMMUNICATION CONNECTOR
11A LENS PORTION
11B LENS PORTION
13A REFRACTION PORTION
13B REFRACTION PORTION
15A SCATTERING MEMBER
15B SCATTERING MEMBER
100 ELECTRONIC DEVICE
110 OPTICAL TRANSMISSION/RECEPTION UNIT
111A COLLIMATOR LENS
120 LIGHT EMITTING UNIT
130 LIGHT RECEIVING UNIT
131A FLAT SURFACE
131B FLAT SURFACE
133A REFRACTION SURFACE
133B REFRACTION SURFACE
151A SCATTERING PORTION
200 OPTICAL COMMUNICATION CABLE
201 CABLE BODY
202A OPTICAL TRANSMISSION LINE
202B OPTICAL TRANSMISSION LINE
300 ELECTRONIC DEVICE
310 OPTICAL TRANSMISSION/RECEPTION UNIT
320 LIGHT EMITTING UNIT
330 LIGHT RECEIVING UNIT
500 MEASUREMENT SYSTEM
510 MEASUREMENT TARGET DEVICE
511 VIDEO STREAM
512 ENCODER
513 PHOTOELECTRIC CONVERSION CIRCUIT
514 RECEIVER
520 MEASUREMENT JIG
521 MEASUREMENT CONNECTOR
530 CONNECTION CABLE
540 MEASURING INSTRUMENT
540a LASER BEAM PROFILER
540b OPTICAL POWER METER
541 SIGNAL PROCESSING UNIT
542 MEASUREMENT DATA GENERATION UNIT
543 STORAGE UNIT
544 DETERMINATION UNIT
545 DISPLAY UNIT

The invention claimed is:

1. A measurement connector comprising:
a housing configured to be attached to an optical communication connector of a measurement target device;
an optical detection element that is provided in the housing and is configured to detect light emitted from the optical communication connector; and
a sensor configured to detect the light emitted from the optical communication connector.

2. The measurement connector according to claim 1, wherein a plurality of the optical detection elements is provided.

3. The measurement connector according to claim 2, wherein the plurality of optical detection elements is arranged in a line.

4. The measurement connector according to claim 2, wherein the plurality of optical detection elements is provided in accordance with a number of pieces of the light emitted from the optical communication connector.

5. The measurement connector according to claim 2, wherein the plurality of optical detection elements is provided on a first surface of the housing and a second surface facing the first surface.

6. The measurement connector according to claim 5, further comprising:
a shielding plate that is provided between the first surface and the second surface,
wherein the shielding plate is configured to block the light emitted from the optical communication connector.

7. The measurement connector according to claim 6, wherein the shielding plate blocks the light emitted from the optical communication connector at an emission angle exceeding a predetermined threshold.

8. The measurement connector according to claim 1, wherein the sensor is a transmission-type position sensor that detects the light emitted from the optical communication connector.

9. The measurement connector according to claim 8, wherein the transmission-type position sensor detects that the light emitted from the optical communication connector travels obliquely.

10. The measurement connector according to claim 8, wherein the transmission-type position sensor is provided on an incident side of the light compared to the optical detection element in the housing.

11. The measurement connector according to claim 8, wherein a plurality of the transmission-type position sensors is provided along an optical path of the light emitted from the optical communication connector.

12. The measurement connector according to claim 11, wherein the plurality of transmission-type position sensors is sensors to detect an emission angle of the light emitted from the optical communication connector.

13. The measurement connector according to claim 1, further comprising:
a positioning member that abuts on an optical component in the optical communication connector is configured to determine a position of the optical detection element with respect to the optical member.

14. The measurement connector according to claim 13, wherein a plurality of the positioning members is provided.

15. The measurement connector according to claim 14, wherein the plurality of positioning members is provided on a first surface of the housing and a second surface facing the first surface.

16. The measurement connector according to claim 1, further comprising:

circuitry configured to process an electric signal output from the optical detection element.

17. The measurement connector according to claim 1, further comprising:

circuitry configured to generate measurement data based on a detection result by the optical detection element.

18. The measurement connector according to claim 8, further comprising:

circuitry configured to generate measurement data based on detection results of the optical detection element and the transmission-type position sensor.

19. A measurement jig comprising:

a measurement connector, wherein the measurement connector includes a housing configured to be attached to an optical communication connector of a measurement target device, an optical detection element that is provided in the housing and is configured to detect light emitted from the optical communication connector, and a sensor configured to detect the light emitted from the optical communication connector.

20. A measurement system comprising:

a measurement jig having a measurement connector; and circuitry configured to generate measurement data, wherein the measurement connector includes a housing configured to be attached to an optical communication connector of a measurement target device, an optical detection element that is provided in the housing and is configured to detect light emitted from the optical communication connector, and a sensor configured to detect the light emitted from the optical communication connector, and wherein the circuitry generates the measurement data based on a detection result of the optical detection element.

* * * * *